(12) United States Patent
Naitou

(10) Patent No.: US 10,602,855 B2
(45) Date of Patent: Mar. 31, 2020

(54) ITEM OF FURNITURE

(71) Applicant: OKAMURA CORPORATION, Yokohama-shi, Kanagawa (JP)

(72) Inventor: Shinya Naitou, Yokohama (JP)

(73) Assignee: OKAMURA CORPORATION, Yokohama-Shi, Kanagawa (JP)

(*) Notice: Subject to any disclaimer, the term of this patent is extended or adjusted under 35 U.S.C. 154(b) by 0 days.

(21) Appl. No.: 15/762,503

(22) PCT Filed: Sep. 15, 2016

(86) PCT No.: PCT/JP2016/077251
§ 371 (c)(1),
(2) Date: Mar. 22, 2018

(87) PCT Pub. No.: WO2017/051760
PCT Pub. Date: Mar. 30, 2017

(65) Prior Publication Data
US 2018/0296004 A1  Oct. 18, 2018

(30) Foreign Application Priority Data
Sep. 25, 2015  (JP) ................. 2015-188870

(51) Int. Cl.
*A47C 31/02* (2006.01)
*A47C 7/40* (2006.01)
*F16B 5/08* (2006.01)

(52) U.S. Cl.
CPC ............... *A47C 31/02* (2013.01); *A47C 7/40* (2013.01); *A47C 31/023* (2013.01); *F16B 5/08* (2013.01)

(58) Field of Classification Search
CPC ............................................ A47C 31/02
USPC ........................................ 428/101
See application file for complete search history.

(56) References Cited

U.S. PATENT DOCUMENTS 6,511,562 B1  1/2003  Coffield

FOREIGN PATENT DOCUMENTS

| JP | U-A-06-077699 | 11/1994 | |
|---|---|---|---|
| JP | A-2001-078852 | 3/2001 | |
| JP | 2002240081 A * | 8/2002 | ............. A47C 7/282 |
| JP | A-2002-240081 | 8/2002 | |

(Continued)

OTHER PUBLICATIONS

International Search Report for PCT/JP2016/077251 dated Nov. 8, 2016.

*Primary Examiner* — Brent T O'Hern
(74) *Attorney, Agent, or Firm* — Nixon Peabody LLP; Jeffrey L. Costellia

(57) ABSTRACT

A furniture sheet is provided, including a sheet body that has a through-hole in at least an edge portion, and longitudinal frame portions that are disposed on the edge portion of the sheet body, and that are respectively attached to the corresponding longitudinal frame portions. The longitudinal edge member includes a first longitudinal member that is disposed on a first surface side of the sheet body, a second longitudinal member that is disposed on a second surface side of the sheet body, and that pinches the sheet body between the first longitudinal member and the second longitudinal member, and a fixing portion that fixes the first longitudinal member and the second longitudinal member to each other together with the sheet body through the through-hole of the sheet body.

1 Claim, 14 Drawing Sheets

(56) References Cited

FOREIGN PATENT DOCUMENTS

| JP | A-2003-239922 | 8/2003 |
|---|---|---|
| JP | B-4652767 | 3/2011 |

* cited by examiner

FIG. 3
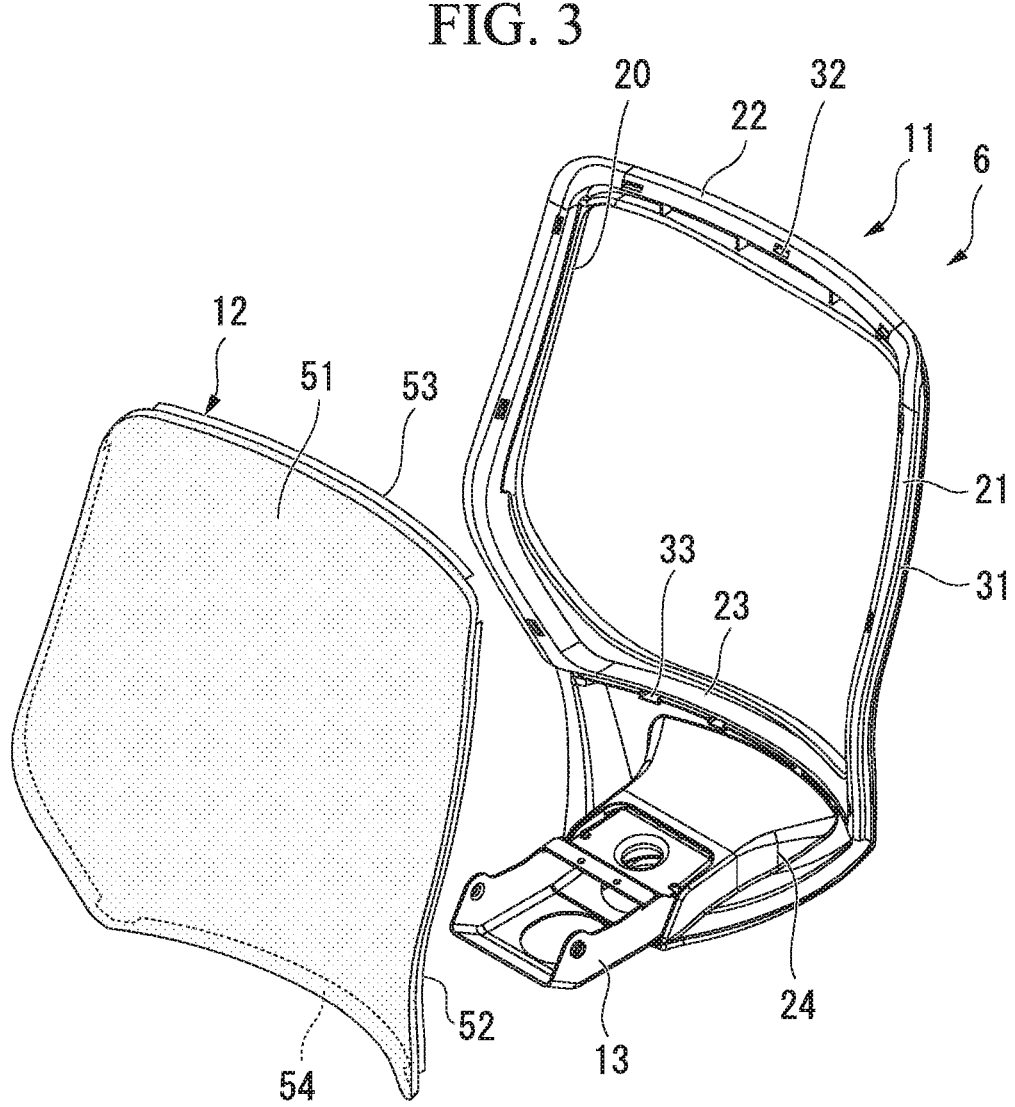
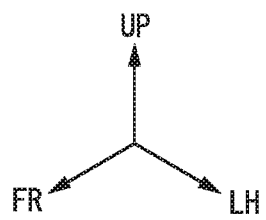

ITEM OF FURNITURE

PRIORITY

Priority is claimed on Japanese Patent Application No. 2015-188870, filed on Sep. 25, 2015, the content of which is incorporated herein by reference.

TECHNICAL FIELD

The present disclosure relates to a furniture sheet, a method of manufacturing a furniture sheet, a furniture surface component member, and an item of furniture.

BACKGROUND

As a backrest of a chair, a configuration is known which includes a frame-shaped backrest frame and an extension material stretched across the backrest frame so as to close an opening portion of the backrest frame. The extension material has a mesh-like sheet body and an edge member disposed in an edge portion of the sheet body. The extension material is attached to the backrest frame via the edge member. In this manner, the extension material is stretched across the backrest frame in a state where desired tension is applied to the sheet body.

Incidentally, in the extension material described above, the sheet body receives a load in a planarly perpendicular direction (thickness direction) due to restoring force of the seat body itself or a seated person's seating posture. Therefore, in order to improve reliability and durability of the chair, it is necessary to ensure fixing strength between the sheet body and the edge member and fixing strength between the edge member and the backrest frame.

For example, prior art publications disclose a fixing structure between the sheet body and the edge member and a fixing structure between the edge member and the backrest frame.

For example, the extension material disclosed in Japanese Unexamined Utility Model Application, First Publication No. H6-77699 ('699 Pub) has a covering sheet and a ring sheet disposed on one surface of the covering sheet. The extension material is fixed to a frame by means of welding in a state where the covering sheet is pinched between a flange portion protruding inward from the backrest frame and the ring sheet.

However, according to a configuration disclosed in '699 Pub, the extension material is fixed to the frame in the planarly perpendicular direction of the covering sheet. Consequently, it is difficult to sufficiently support the load acting in the planarly perpendicular direction acting from, for example, one surface side of the covering sheet. In addition, the extension material is directly welded to the frame. Accordingly, it is difficult to align the frame and the extension material with each other, and there is a problem of poor manufacturing efficiency.

The extension material disclosed in Japanese Unexamined Patent Application, First Publication No. 2003-239922 ('922 Pub.) includes a skin member and a resin cord attached to the skin member by being sewed from one surface side of the skin member. The extension material is fixed to a back plate by fitting the resin cord into a groove formed in the back plate.

However, according to a configuration disclosed in '922 Pub., the resin cord is fixed from only one surface side of the skin member. Accordingly, there is still room for improvement, particularly in terms of ensuring the fixing strength between the sheet body and the resin cord.

Furthermore, Japanese Patent No. 4652767 discloses a configuration including the sheet body and the edge member fixed to an edge portion of the sheet body by means of molding.

However, according to a configuration disclosed in Japanese Patent No. 4652767 described above, the edge member is molded to the edge portion of the sheet body. Accordingly, a molding die becomes complicated, which may lead to increased manufacturing cost and poor manufacturing efficiency. In addition, there is a problem in that the edge member is less freely designed.

SUMMARY

The following presents a simplified summary of one or more embodiments in order to provide a basic understanding of present technology. This summary is not an extensive overview of all contemplated embodiments of the present technology, and is intended to neither identify key or critical elements of all examples, nor delineate the scope of any or all aspects of the present technology. Its sole purpose is to present some concepts of one or more examples in a simplified form as a prelude to the more detailed description that is presented later. The present disclosure is made in view of the above-described circumstances, and an object thereof is to provide a furniture sheet, a method of manufacturing a furniture sheet, a furniture surface component member, and an item of furniture which are capable of ensuring fixing strength between a sheet body and an edge member, while achieving cost reduction, improved manufacturing efficiency, and much freer design.

According to the present disclosure, in order to achieve the above-described object, a furniture sheet provided between at least two support portions arranged apart from each other is provided. The furniture sheet includes a sheet body that has through-holes in at least edge portions, and edge members that are disposed on the edge portions of the sheet body and are respectively attached to the support portions corresponding thereto. Each of the edge members includes a first member that is disposed on a first surface side of the sheet body, a second member that is disposed on a second surface side of the sheet body, the sheet body being pinched between the first member and the second member, and a fixing portion that fixes the first member and the second member to each other together with the sheet body through a through-hole of the through-holes of the sheet body.

According to the present disclosure, a method of manufacturing a furniture sheet provided between at least two support portions arranged apart from each other is provided, in which the furniture sheet includes a sheet body that has a through-hole in at least edge portions, and edge members that are disposed on the edge portions of the sheet body, and that are respectively attached to the support portions corresponding thereto. The method includes a pinching step of pinching each edge portion of the sheet body between a first member and a second member of each of the edge members in a thickness direction thereof, and a fixing step of fixing the first member and the second member to each other together with the sheet body, through a through-hole of the through-holes of the sheet body, by a fixing portion interposed between the first member and the second member.

According to this configuration, in the fixing step, in a case where the fixing portion interposed between the first member and the second member fixes the first member and the second member to each other by means of welding or adhesion, the fixing portion in a liquid phase spreads in a wet state between the first member and the second member in a plane direction of the sheet body. In this case, the fixing portion is made to penetrate the through-hole of the sheet body and is provided between the first member and the second member, thereby interlocking the fixing portion with the sheet body (so-called anchor effect). In this state, the fixing portion is solidified, thereby enabling the sheet body to be firmly fixed between the first member and the second member. In this manner, it is possible to ensure fixing strength between the sheet body and the edge member. Accordingly, regardless of a direction or a magnitude of a load (acting in a plane direction and a planarly perpendicular direction) applied to the sheet body, it is possible to prevent the sheet body and the edge member from being stripped away from each other.

In addition, the sheet body is pinched in the thickness direction with the first member and the second member. Accordingly, it is possible to ensure the fixing strength acting on both sides of the sheet body in the planarly perpendicular direction.

In particular, the first member and the second member are fixed by the fixing portion. Accordingly, for example, compared to a case where the edge member is molded to the sheet body as in the related art, it is possible to simplify a molding die for molding the edge member.

Therefore, according to the present disclosure, it is possible to achieve cost reduction and improved manufacturing efficiency. Furthermore, the edge member is manufactured as a single body. Accordingly, compared to the above-described molding, the edge member can be more freely designed.

In the furniture sheet according to the present disclosure, each of the edge members may have a connection portion that connects the first member and the second member to each other such that the first member and the second member are movable in a direction closer to or apart from the sheet body.

According to this configuration, in a state before the edge member is fixed to the sheet body, the edge member is more easily handled. In addition, when the edge member is fixed to the sheet body, the first member and the second member are caused to pivot in a direction closer to the sheet body. Accordingly, the sheet body can be pinched between the first member and the second member. In this manner, compared to a case where the sheet body is pinched with the first member and the second, member which are separate bodies, it is possible to easily and very accurately align the first member and the second member with each other. As a result, it is possible to achieve further improved manufacturing efficiency.

In the method of manufacturing a furniture sheet according to the present disclosure, the fixing portion may be a projection portion whose proximal end portion is integrally formed in at least one member of the first member and the second member. In the pinching step, the projection portion may penetrate the inside of the through-hole of the sheet body. In the fixing step, the first member and the second member may be fixed to each other by melting the projection portion.

According to this configuration, the projection portion formed in at least one member is caused to function as the fixing portion. Accordingly, compared to a case of using the fixing portion, which is a separate body from the first member and the second member, it is possible to achieve improved manufacturing efficiency. In addition, in the pinching step, the projection portion is made to penetrate into the through-hole of the sheet body. Accordingly, the movement of the sheet body in the plane direction with respect to the edge member until the fixing step can be regulated by the projection portion. In this manner, the edge portion of the sheet body can be fixed to the edge member at a desired position.

In the method of manufacturing a furniture sheet according to the present disclosure, a diameter of the projection portion may decrease from the proximal end portion toward a distal end portion thereof.

According to this configuration, the diameter of the projection portion decreases from the proximal end portion to the distal end portion. Accordingly, the projection portion can easily penetrate the through-hole of the sheet body in the pinching step. In addition, in the above-described pinching step, surface pressure acting between the first member and the projection portion can be increased. Therefore, it is possible to prevent misalignment between the first member and the second member in the plane direction.

Furthermore, for example, when the projection portion is fixed by means of ultrasonic welding, it is possible to prevent ultrasonic waves applied to the projection portion from being diffused as the ultrasonic waves propagate to the distal end portion. That is, it is possible to effectively apply the ultrasonic waves to the whole projection portion.

Therefore, it is possible to achieve further improved manufacturing efficiency.

According to the present disclosure, a furniture surface component member is provided, including at least the two support portions arranged apart from each other, and the furniture sheet is provided between the support portions according to the present disclosure. The support portions have fitting recessed portions which are open on outer peripheral surfaces of the support portions and into which the edge members of the furniture sheet are fitted.

According to this configuration, the furniture surface component member includes the above-described furniture sheet according to the present disclosure. Therefore, it is possible to provide the furniture surface component member which prevents time-dependent degradation and which is excellent in reliability and durability.

According to the present disclosure, an item of furniture is provided, including the above-described furniture surface component member according to the present disclosure.

According to this configuration, the item of furniture includes the above-described furniture surface component member according to the present disclosure. Therefore, it is possible to provide the item of furniture which prevents time-dependent degradation and which is excellent in reliability and durability.

According to the present disclosure, it is possible to ensure the fixing strength between the sheet body and the edge member, while achieving cost reduction, improved manufacturing efficiency, and much freer design.

BRIEF DESCRIPTION OF DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure, and are therefore not to be considered as limiting of its scope The principles are described and explained with additional specificity and detail through the use of the following drawings.

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims. The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims

FIG. 3 is an exploded perspective view of a backrest according to the embodiment.

DETAILED DESCRIPTION

Figure 1:
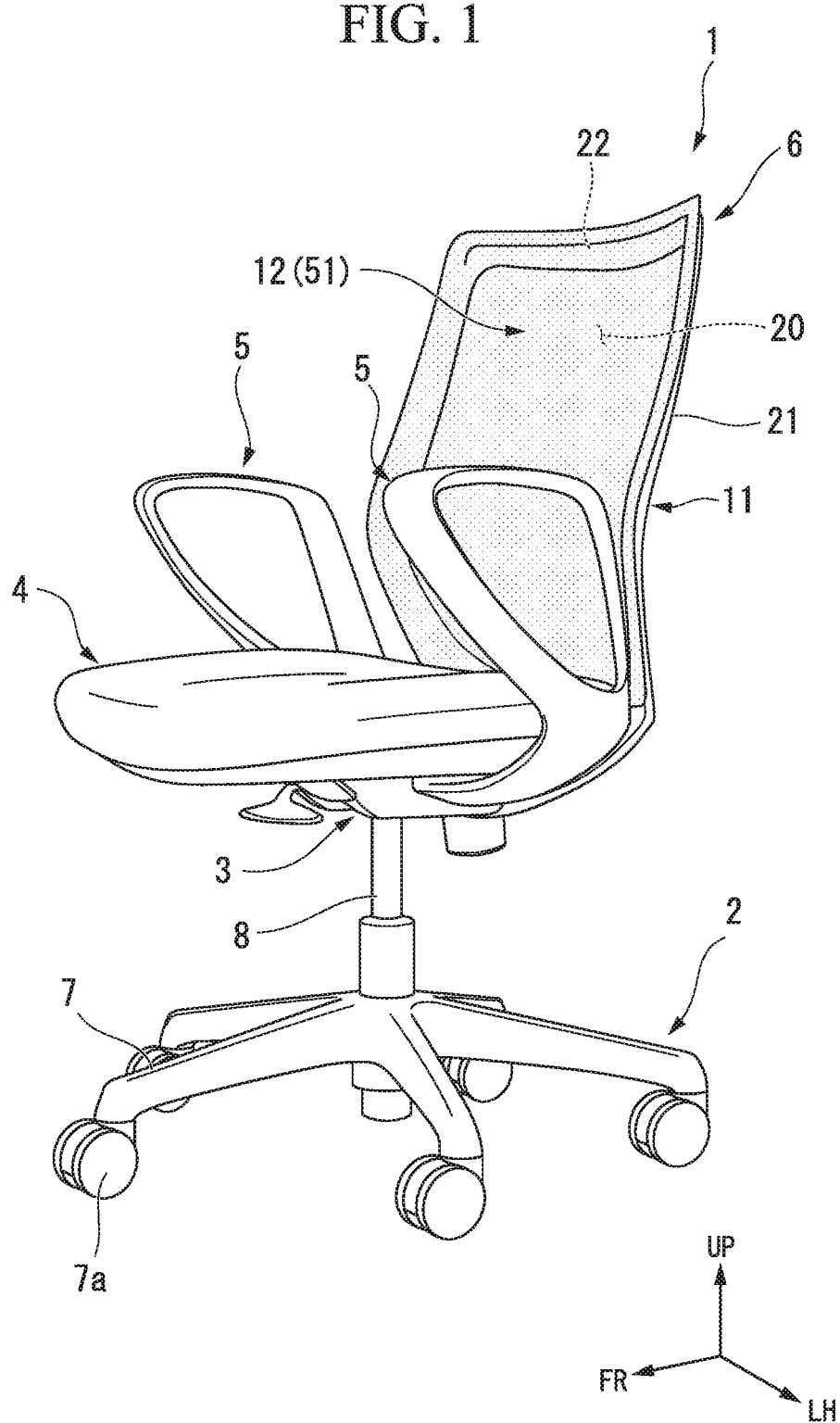
FIG. 1 is a perspective view of a chair when viewed from the front according to an embodiment.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention. In the following description, forward, rearward, upward, downward, rightward, and leftward directions are the same as directions of a person (seated person) seated on a chair 1 while adopting a normal posture. In addition, in the drawings, an arrow UP indicates upward, an arrow FR indicates forward, and an arrow LH indicates leftward.

FIG. 1 is a perspective view when the chair 1 is viewed from the front.

Figure 2:
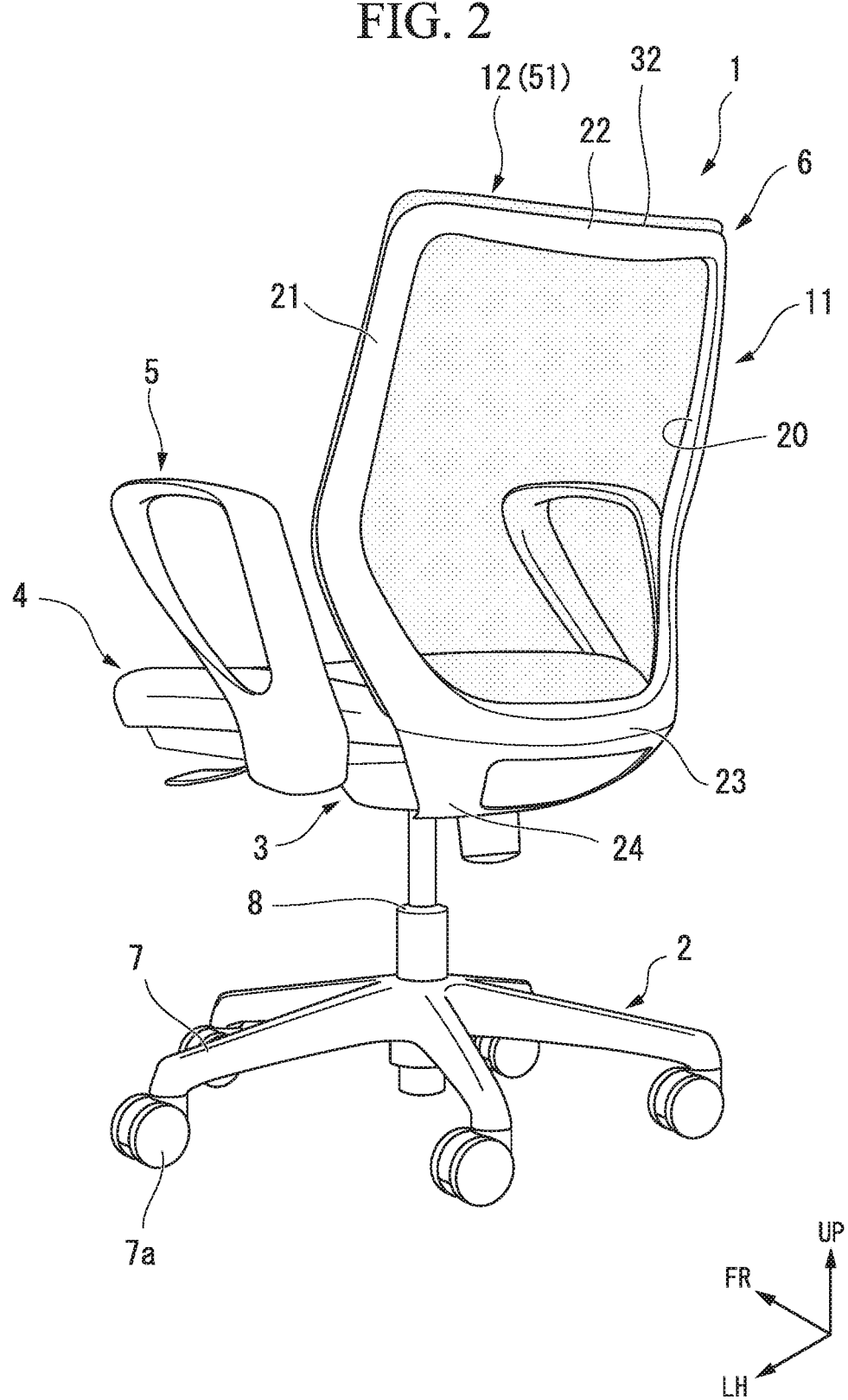
FIG. 2 is a perspective view of the chair when viewed from the rear according to the embodiment.

FIG. 2 is a perspective view when the chair 1 is viewed from the rear.

As illustrated in FIGS. 1 and 2, the chair (furniture) 1 includes a leg portion 2, a support base 3 disposed in an upper end portion of the leg portion 2, a seat body 4 supported by the support base 3, armrests 5 disposed on both right and left sides of the seat body 4, and a backrest (furniture surface component member) 6 extending upward from a rear end portion of the support base 3.

The leg portion 2 includes a multipoint leg 7 and a leg pillar 8 erected from a central portion of the multipoint leg 7.

A caster 7a which can travel on a floor is attached to each leg portion of the multipoint leg 7.

The leg pillar 8 is internally equipped with a gas spring (not illustrated) serving as a raising-lowering mechanism.

The support base 3 is attached to an upper end portion of the leg pillar 8. The support base 3 is internally equipped with a raising-lowering adjustment mechanism (not illustrated) for adjusting the above-described raising-lowering mechanism, and a tilting adjustment mechanism (not illustrated) of the backrest 6.

The seat body 4 supports the buttocks of the seated person from below.

The armrests 5 respectively extend from the support base 3 to right and left sides, and are disposed so as to extend upward on both the right and left sides with respect to the seat body 4. The armrests 5 support the arms of the seated person from below.

The backrest 6 is disposed behind the seat body 4 and the armrests 5. The backrest 6 supports waist and back portions of the seated person from behind. The backrest 6 is formed in an arc shape protruding rearward in plan view when viewed from above. In addition, the backrest 6 is formed in a gentle S-shape in a side view when viewed in a rightward-leftward direction.

FIG. 3 is an exploded perspective view of the backrest 6.

Figure 4:
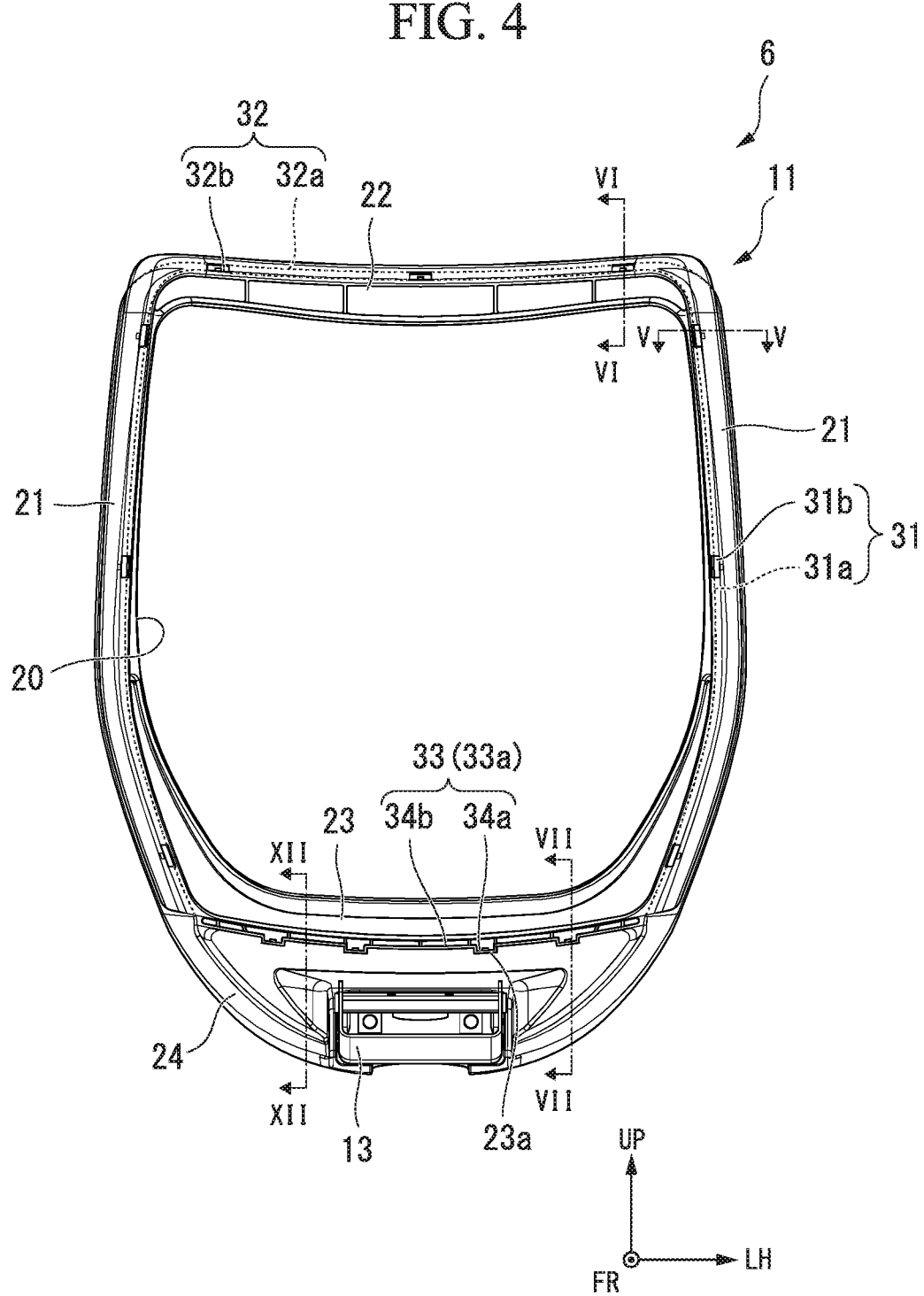
FIG. 4 is a front view of a backrest frame according to the embodiment.

FIG. 4 is a front view of a backrest frame 11.

As illustrated in FIGS. 3 and 4, the backrest 6 includes the backrest frame 11, an extension material (furniture sheet) 12 disposed in the backrest frame 11, and an attachment bracket 13 for attaching the backrest frame to the above-described support base 3.

The backrest frame 11 is formed in a rectangular frame shape in plan view when viewed from the front. The backrest frame 11 functions as a strength member when supporting a load of the seated person. Specifically, the backrest frame 11 includes a pair of longitudinal frame portions (support portions) 21 disposed on both the right and left sides, an upper frame portion (support portion) 22 which connects upper end portions of the longitudinal frame portions 21 to each other, and a lower frame portion (support portion) 23 which connects lower end portions of the longitudinal frame portions 21 to each other. An attachment arm 24 extending downward as the attachment arm 24 extends forward is connected to the lower frame portion 23. For example, the backrest frame 11 is formed of a resin material, and is integrally formed by means of injection molding. However, the backrest frame 11 may be appropriately formed as a separate body.

The attachment bracket 13 is disposed in a front end portion of the attachment arm 24. The attachment bracket 13 is attached to the support base 3 below the seat body 4. For example, the attachment bracket 13 is configured to include metal.

Fitting recessed portions 31 to 33 for attaching the extension material 12 are formed in respective frame portions 21 to 23 of the backrest frame 11 so as to be open outward of the respective frame portions 21 to 23. The fitting recessed portions 31 to 33 are a longitudinal fitting recessed portion 31 formed in the longitudinal frame portion 21, an upper fitting recessed portion 32 formed in the upper frame portion 22, and a lower fitting recessed portion 33 formed in the lower frame portion 23.

Figure 5:
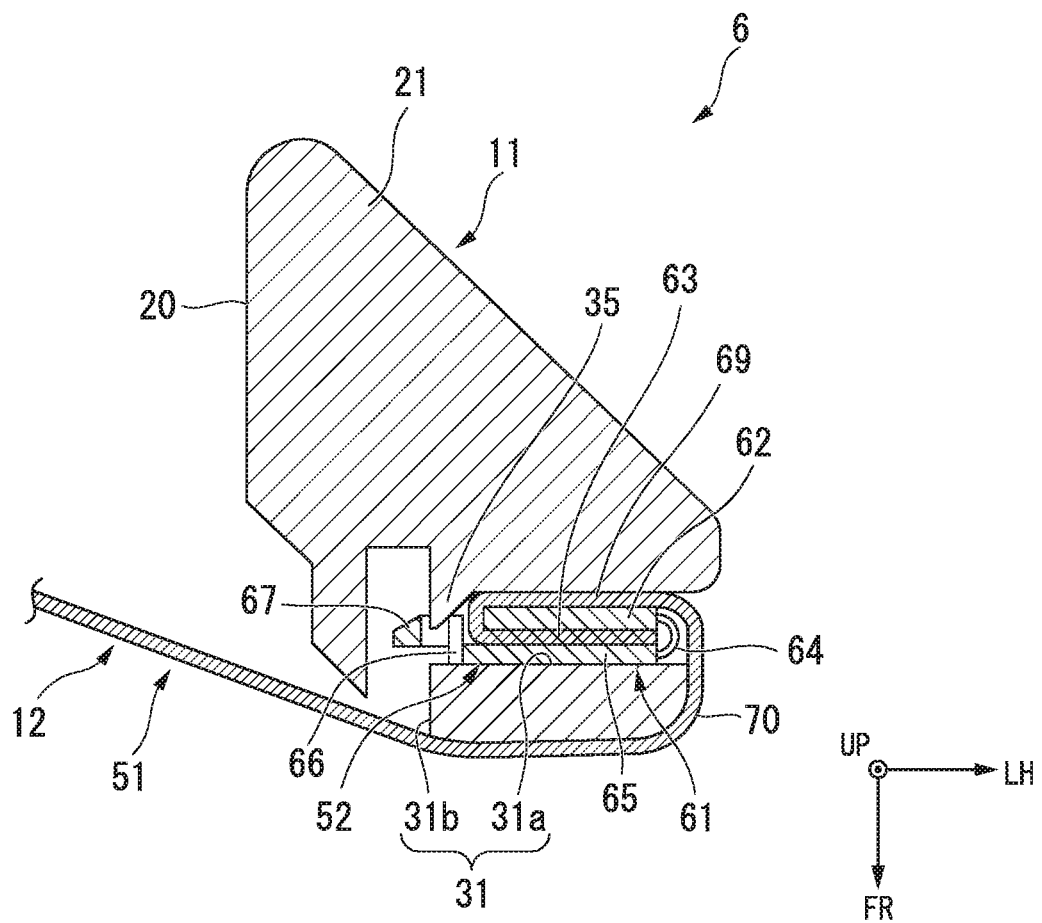
FIG. 5 is a sectional view taken along line V-V in FIG. 4 according to the embodiment.

FIG. 5 is a sectional view taken along line V-V in FIG. 4.

As illustrated in FIGS. 4 and 5, the longitudinal fitting recessed portion 31 has a first longitudinal recessed portion 31a and a second longitudinal recessed portion 31b. The respective longitudinal fitting recessed portions 31 have a bilaterally symmetrical configuration in the respective longitudinal frame portions 21. Thus, in the following description, the longitudinal fitting recessed portion 31 formed in one (left side) longitudinal frame portion 21 will be described. The description of the longitudinal fitting recessed portion 31 formed in the other longitudinal frame portion 21 will be omitted.

The first longitudinal recessed portion 31a is formed on a surface (hereinafter, referred to as an outer surface) located outward in the rightward-leftward direction in the longitudinal frame portion 21. Specifically, the first longitudinal recessed portion 31a is recessed inward in the rightward-leftward direction from an outer surface of the longitudinal frame portion 21. That is, the first longitudinal recessed portion 31a is open outward in the rightward-leftward direction on an outer surface of the longitudinal frame portion 21. In the first longitudinal recessed portion 31a, the longitudinal frame portion 21 is extended along an upward-downward direction.

The second longitudinal recessed portion 31b is formed on a front surface of the longitudinal frame portion 21 at an interval in the upward-downward direction. The second longitudinal recessed portion 31b is recessed rearward from the front surface of the longitudinal frame portion 21. The rear end portion of the second longitudinal recessed portion 31b communicates with an inner end portion in the rightward-leftward direction in the first longitudinal recessed portion 31a. In this case, an extending direction of the first longitudinal recessed portion 31a and an extending direction of the second longitudinal recessed portion 31b are orthogonal to each other. However, an intersection angle between the extending direction of the first longitudinal recessed portion 31a and the extending direction of the second longitudinal recessed portion 31b can be appropriately changed. In the illustrated example, the rear end portion of the second longitudinal recessed portion 31b is located behind the first longitudinal recessed portion 31a.

As illustrated in FIG. 5, a longitudinal frame engagement portion 35 protruding forward is formed in a boundary portion between the first longitudinal recessed portion 31a and the second longitudinal recessed portion 31b. The longitudinal frame engagement portion 35 is formed in a triangular shape in a cross-sectional view along the rightward-leftward direction. A surface located outward in the rightward-leftward direction of the longitudinal frame engagement portion 35 (a surface located on an opening portion side of the first longitudinal recessed portion 31a (hereinafter, referred to as a guide surface) defines a portion of an inner surface of the first longitudinal recessed portion 31a. The guide surface is an inclined surface extending forward as the guide surface extends inward in the rightward-leftward direction.

On the other hand, in the longitudinal frame engagement portion 35, a surface located inward in the rightward-leftward direction (surface located on a side opposite to the opening portion side of the first longitudinal recessed portion 31a (hereinafter, referred to as an engagement surface)) defines a portion of an inner surface of the second longitudinal recessed portion 31b. The engagement surface has an erected surface extending in a direction orthogonal to the extending direction of the first longitudinal recessed portion 31a (extending direction of the second longitudinal recessed portion 31b). That is, the engagement surface of the longitudinal frame engagement portion 35 is exposed outward of the longitudinal frame portion 21 through the opening portion of the second longitudinal recessed portion 31b. A case of being "exposed" outward of the longitudinal frame portion 21 through the opening portion of the second longitudinal recessed portion 31b means a case where the engagement surface faces the extending direction of the second longitudinal recessed portion 31b or the engagement surface faces the opening portion of the second longitudinal recessed portion 31b. A definition of "exposed" is similarly applied to the upper fitting recessed portion 32 and the lower fitting recessed portion 33. In addition, if the longitudinal frame engagement portion 35 is formed in the boundary portion between the first longitudinal recessed portion 31a and the second longitudinal recessed portion 31b, the protruding direction is not limited to the forward direction, and the longitudinal frame engagement portion 35 may protrude rearward.

Figure 6:
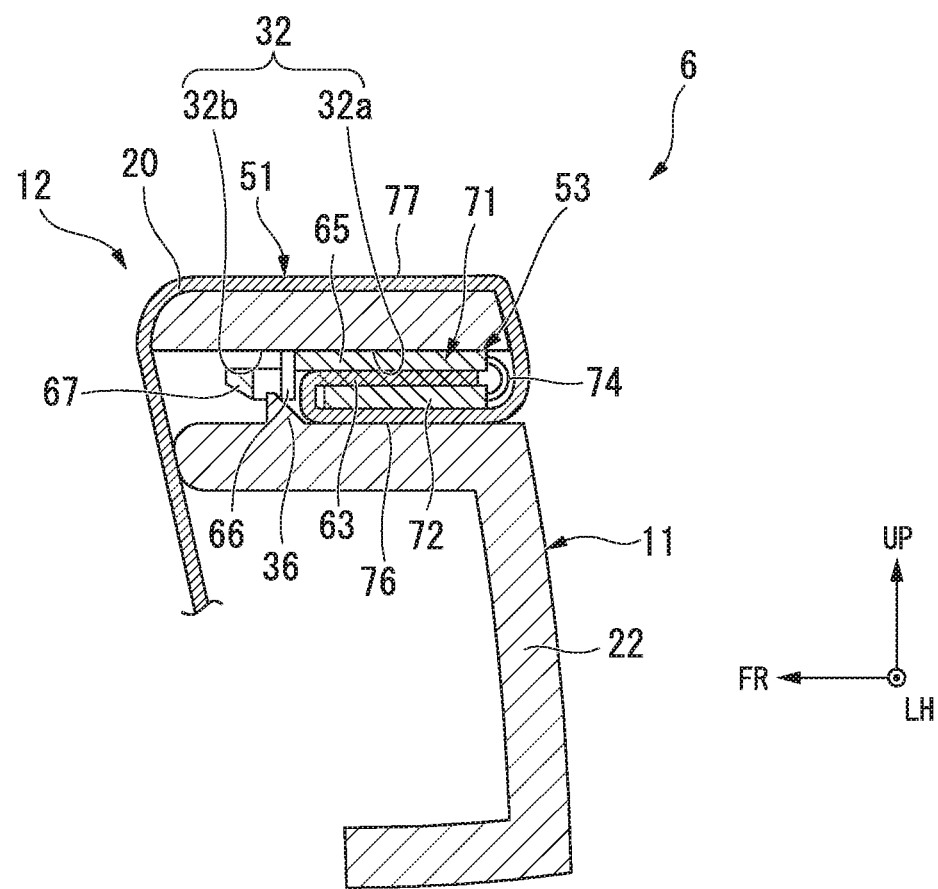
FIG. 6 is a sectional view taken along line VI-VI in FIG. 4.

FIG. 6 is a sectional view taken along line VI-VI in FIG. 4.

As illustrated in FIG. 6, the upper fitting recessed portion 32 has a first upper recessed portion 32a and a second upper recessed portion 32b.

As illustrated in FIG. 6, the first upper recessed portion 32a is recessed forward from a rear surface of the upper frame portion 22. That is, the first upper recessed portion 32a is open rearward on the rear surface of the upper frame portion 22. As illustrated in FIG. 4, the first upper recessed portion 32a extends the upper frame portion 22 along the rightward-leftward direction.

The second upper recessed portion 32b is formed on the front surface of the upper frame portion 22 at an interval in the rightward-leftward direction. As illustrated in FIG. 6, the second upper recessed portion 32b is recessed rearward from a front surface of the upper frame portion 22. A front end portion of the second upper recessed portion 32b communicates with a rear end portion of the first upper recessed portion 32a. In the illustrated example, the extending direction of the first upper recessed portion 32a and the extending direction of the second upper recessed portion 32b coincide with each other. Therefore, a portion having the second upper recessed portion 32b formed in the upper fitting recessed portion 32 penetrates the upper frame portion 22 in the forward-rearward direction through the first upper recessed portion 32a and the second upper recessed portion 32b. However, an intersection angle between the extending direction of the first upper recessed portion 32a and the extending direction of the second upper recessed portion 32b can be appropriately changed.

An upper frame engagement portion 36 protruding upward is formed in the boundary portion between the first upper recessed portion 32a and the second upper recessed portion 32b. The upper frame engagement portion 36 is formed in a triangular shape in a longitudinal sectional view along the upward-downward direction. A rear surface (surface located on the opening portion side of the first upper recessed portion 32a (hereinafter, referred to as a guide surface)) of the upper frame engagement portion 36 defines a portion of the inner surface of the first upper recessed portion 32a. The guide surface has an inclined surface extending upward as it goes forward.

On the other hand, a front surface (surface located on a side opposite to the opening portion side of the first upper recessed portion 32a (hereinafter, referred to as an engagement surface)) of the upper frame engagement portion 36 defines a portion of the inner surface of the second upper recessed portion 32b. The engagement surface has an erected surface extending in a direction orthogonal to the extending direction of the first upper recessed portion 32a and the second upper recessed portion 32b. That is, the engagement surface of the upper frame engagement portion 36 is exposed outward of the upper frame portion 22 through the opening portion of the second upper recessed portion 32b. If the upper frame engagement portion 36 is formed in the boundary portion between the first upper recessed portion 32a and the second upper recessed portion 32b, the protruding direction is not limited to the upward direction, and the upper frame engagement portion 36 may protrude downward.

Figure 7:
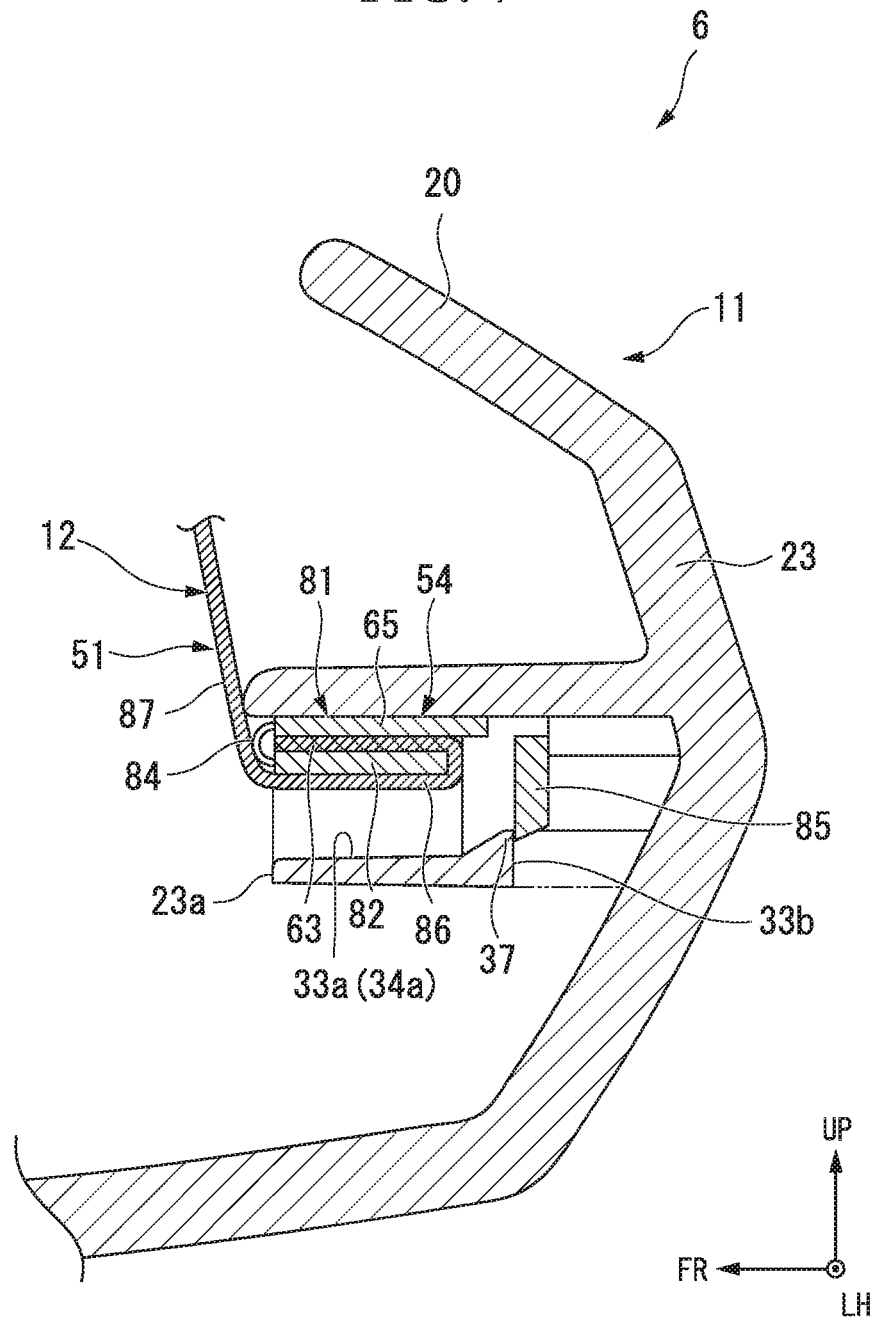
FIG. 7 is a sectional view taken along line VII-VII in FIG. 4.

FIG. 7 is a sectional view taken along line VII-VII in FIG. 4.

As illustrated in FIGS. 4 and 7, the lower fitting recessed portion 33 has a first lower recessed portion 33a and a second lower recessed portion 33b.

As illustrated in FIG. 7, the first lower recessed portion 33a is recessed rearward from a front surface of the lower frame portion 23. That is, the first lower recessed portion 33a is open forward on the front surface of the lower frame portion 23. In the first lower recessed portion 33a, the lower frame portion 23 is extended along the rightward-leftward direction.

As illustrated in FIG. 4, in the above-described first lower recessed portions 33a, a plurality of locations arranged apart from each other in the rightward-leftward direction are set as a wide portion 34a. The wide portion 34a has a wider width in the upward-downward direction than a portion (hereinafter, simply referred to as a narrow portion 34b) other than the wide portion 34a in the first lower recessed portion 33a. Specifically, as illustrated in FIG. 4, the wide portion 34a is recessed downward with respect to the narrow portion 34b. In this case, in the inner surfaces of the wide portion 34a and the narrow portion 34b, top surfaces (upper surface of the first lower recessed portion 33a) are flush with each other. On the other hand, a bottom surface of the wide portion 34a is located below a bottom surface of the narrow portion 34b. Therefore, a portion defining the bottom surface of the wide portion 34a in the lower frame portion 23 has a bulging portion 23a which bulges downward with respect to the portion defining the bottom surface of the narrow portion 34b. The number or a position of the wide portions 34a can be appropriately changed.

As illustrated in FIG. 7, the second lower recessed portion 33b is formed at a position corresponding to the above-described wide portion 34a in the lower frame portion 23. The second lower recessed portions 33b are recessed toward one side in the rightward-leftward direction from the rear end portion of the above-described bulging portion 23a. That is, the second lower recessed portion 33b communicates with the inside of the wide portion 34a in the rear end portion of the wide portion 34a. Therefore, the extending direction of the first lower recessed portion 33a (wide portion 34a) and the extending direction of the second lower recessed portion 33b are orthogonal to each other in plan view when viewed in the upward-downward direction. However, an intersection angle between the extending direction of the first lower recessed portion 33a and the extending direction of the second lower recessed portion 33b can be appropriately changed.

The above-described second lower recessed portion 33b is open toward the other side and downward in the rightward-leftward direction in the bulging portion 23a of the lower frame portion 23. In the present embodiment, one side end portion in the rightward-leftward direction in the second lower recessed portion 33b is terminated inside the wide portion 34a. However, the second lower recessed portion 33b may penetrate the bulging portion 23a of the lower frame portion 23 in the rightward-leftward direction.

On the bottom surface of the first lower recessed portion 33a, the lower frame engagement portion 37 protruding upward is formed in the boundary portion between the first lower recessed portion 33a and the second lower recessed portion 33b. The lower frame engagement portion 37 is formed in a triangular shape in a longitudinal sectional view along the upward-downward direction. A front surface (surface located on the opening portion side of the first lower recessed portion 33a (hereinafter, referred to as a guide surface)) of the lower frame engagement portion 37 defines a portion of the inner surface of the first lower recessed portion 33a. The guide surface has an inclined surface extending upward as it goes rearward.

On the other hand, a rear surface (surface located on a side opposite to the opening portion side of the first lower recessed portion 33a (hereinafter, referred to as an engagement surface)) of the lower frame engagement portion 37 defines a portion of the inner surface of the second lower recessed portion 33b. The engagement surface has an erected surface extending in a direction intersecting the extending direction of the first lower recessed portion 33a (direction orthogonal to the extending direction of the second lower recessed portion 33b). That is, the engagement surface of the lower frame engagement portion 37 is exposed outward of the lower frame portion 23 through the opening portion of the second lower recessed portion 33b. If the lower frame engagement portion 37 is formed in the boundary portion between the first lower recessed portion 33a and the second lower recessed portion 33b, the protruding direction is not limited to the upward direction, and the lower frame engagement portion 37 may protrude in the rightward-leftward direction.

As illustrated in FIG. 3, the extension material 12 covers the opening portion 20 defined by the respective frame portions 21 to 23 of the backrest frame 11, from the front. Specifically, the extension material 12 includes a sheet body 51 and edge members 52 to 54 disposed in an edge portion of the sheet body 51.

The sheet body 51 is formed by combining stretchable synthetic resin fibers with each other in a mesh shape. Therefore, in the sheet body 51, through-holes penetrating in the thickness direction are formed at intervals in the entire plane direction. In the sheet body 51, an outer shape in plan view when viewed from the forward-rearward direction is larger than the opening portion 20 of the backrest frame 11. Without being limited to the mesh shape, the sheet body 51 may employ a cloth shape or a film shape, for example. However, it is preferable that the through-hole penetrating in the thickness direction be formed at least on the edge portion of the sheet body 51.

For example, the edge members 52 to 54 are formed of a resin material which is more rigid than a configuration material of the sheet body 51 and which is softer (less rigid) than the backrest frame 11. Specifically, the edge members 52 to 54 are longitudinal edge members 52 respectively disposed on both the right and left side edge portions of the sheet body 51, an upper edge member 53 disposed in the upper edge portion of the sheet body 51, and a lower edge member 54 disposed in the lower edge portion of the sheet body 51.

As illustrated in FIG. 5, the longitudinal edge member 52 is fitted into the first longitudinal recessed portion 31*a* of the longitudinal fitting recessed portion 31, from the outside in the rightward-leftward direction. Specifically, the longitudinal edge member 52 includes a first longitudinal member 61 disposed on a first surface side of the sheet body 51 (side edge portion), a second longitudinal member 62 disposed on a second surface side of the sheet body 51, and a hinge portion (connection portion) 64 which connects the respective longitudinal members 61 and 62 to each other. In the longitudinal edge member 52, the first longitudinal member 61, the second longitudinal member 62, and the hinge portion 64 are formed integrally with each other. The respective longitudinal edge members 52 have a bilaterally symmetrical configuration. Thus, in the following description, one (left side) longitudinal edge member 52 will be described, and description of the other longitudinal edge member 52 will be omitted.

Figure 8:
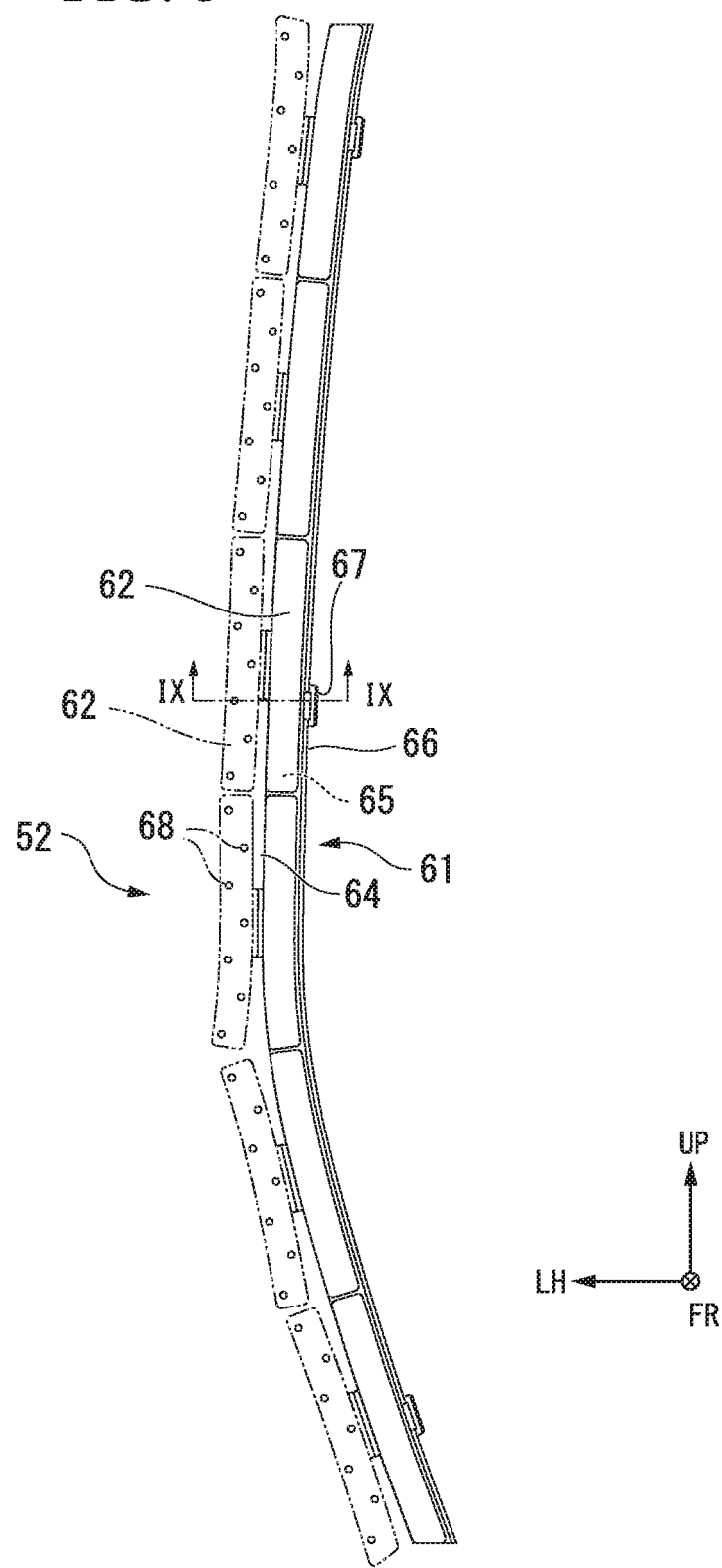
FIG. 8 is a rear view of a longitudinal edge member according when viewed from the rear according to the embodiment.

FIG. 8 is a rear view of the longitudinal edge member 52 when viewed from the rear. A dashed line in FIG. 8 indicates the second longitudinal member 62 and the hinge portion 64 before the longitudinal edge member 52 is fixed to the sheet body 51.

As illustrated in FIGS. 5 and 8, the first longitudinal member 61 has a base portion 65, a step portion 66 rising from the base portion 65, and a hook portion 67 formed in the step portion 66.

The base portion 65 is formed in a plate shape extending in the upward-downward direction, while the forward-rearward direction is set to the thickness direction.

The base portion 65 has an outer shape the same as an outer shape of the longitudinal frame portion 21, in a front view when viewed in the forward-rearward direction.

The step portion 66 protrudes rearward from an inner end edge in the rightward-leftward direction in the base portion 65. The step portion 66 is formed at an interval in the upward-downward direction while avoiding the portion corresponding to the above-described longitudinal frame engagement portion 35 in the base portion 65.

As illustrated in FIG. 5, the hook portion 67 engages with the above-described longitudinal frame engagement portion 35 in the rightward-leftward direction. As illustrated in FIG. 8, the hook portion 67 is formed in an arch shape protruding inward in the rightward-leftward direction in a front view when viewed in the forward-rearward direction. The hook portion 67 connects the adjacent step portions 66 to each other in the upward-downward direction. As illustrated in FIG. 5, a rear surface of the hook portion 67 has a guide surface which inclines forward as it goes inward in the rightward-leftward direction. On the other hand, a face located outward in the rightward-leftward direction in the hook portion 67 has an engagement surface extending in a direction orthogonal to the rightward-leftward direction. The engagement surface of the hook portion 67 moves closer to or comes into contact with the engagement surface of the longitudinal frame engagement portion 35, from the inside in the rightward-leftward direction.

The second longitudinal member 62 is disposed behind the first longitudinal member 61 inside the longitudinal fitting recessed portion 31. The second longitudinal member 62 pinches a side edge portion of the sheet body 51 between the first longitudinal member 61 and the second longitudinal member 62 in the forward-rearward direction. As illustrated in FIG. 8, in a state where the second longitudinal member 62 is divided into a plurality of pieces in the upward-downward direction (extending direction of the first longitudinal member 61), the second longitudinal member 62 overlaps the first longitudinal member 61 (base portion 65) in the forward-rearward direction, in the entire upward-downward direction. However, the number of divided pieces of the second longitudinal member 62 can be appropriately changed. In addition, the second longitudinal member 62 may have a length the same as that of the base portion 65 of the first longitudinal member 61 in the upward-downward direction, and may be formed integrally with the base portion 65 of the first longitudinal member 61.

As illustrated in FIG. 5, the hinge portion 64 connects outer end portions (front side end portions in a direction inserted into the longitudinal fitting recessed portion 31) of the first longitudinal member 61 and the second longitudinal member 62 to each other in the rightward-leftward direction. Specifically, the hinge portion 64 is formed to be thinner than the first longitudinal member 61 and the second longitudinal member 62. The hinge portion 64 is formed in an arc shape protruding outward in the rightward-leftward direction. In this manner, the hinge portion 64 is elastically deformable in the radial direction (thickness direction) of the hinge portion 64. In the illustrated example, an outer end portion in the rightward-leftward direction in the hinge portion 64 is located inward in the rightward-leftward direction, further from an opening edge of the longitudinal fitting recessed portion 31 (first longitudinal recessed portion 31*a*).

As illustrated in FIG. 5, the first longitudinal member 61 and the second longitudinal member 62 are fixed to each other together with the sheet body 51 by the fixing portion 63. The fixing portion 63 penetrates the side edge portion of the sheet body 51 in the thickness direction, and fixes the first longitudinal member 61 and the second longitudinal member 62 to each other by welding both of these in the forward-rearward direction. That is, in a state where the fixing portion 63 is wet and spreads between the first longitudinal member 61 and the second longitudinal member 62 through a mesh portion (through-hole) of the sheet body 51, the fixing portion 63 fixes the first longitudinal member 61 and the second longitudinal member 62 to each other together with the sheet body 51. In the present embodiment, the term fixing means chemically joining the first longitudinal member 61 and the second longitudinal member 62 to each other together with the sheet body 51, such as by means of welding and adhesion.

Figure 9:
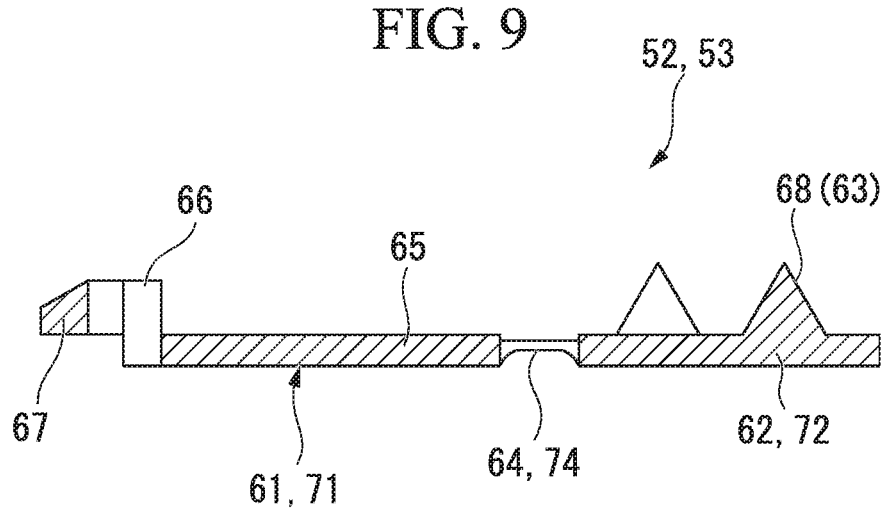
FIG. 9 is a sectional view corresponding to line IX-IX in FIG. 8 which illustrates a state before being fixed to a sheet body.

FIG. 9 is a sectional view corresponding to line IX-IX in FIG. 8 which illustrates a state before the fixing portion 63 is fixed to the sheet body 51.

Here, as illustrated in FIG. 9, in a state before being fixed to the sheet body 51, the above-described fixing portion 63 is configured to include a projection portion 68 formed integrally with the second longitudinal member 62. The projection portion 68 is formed in a conical shape protruding in the thickness direction of the second longitudinal member 62. That is, the projection portion 68 gradually decreases in diameter from the proximal end portion toward the distal end portion. The length from the proximal end portion to the distal end portion of the projection portion 68 is longer than the thickness of the sheet body 51.

As illustrated in FIG. 8, the projection portions 68 are arranged in the second longitudinal member 62 in two rows arranged apart from each other in the rightward-leftward direction, and at an interval in the upward-downward direction. In the example illustrated, the projection portions 68 in each row are arrayed at different positions (differently) in the upward-downward direction. However, the projection portion 68 may be formed in at least one of the first longitudinal member 61 and the second longitudinal member 62. In addition, a shape or a layout of the projection portion 68 can be appropriately changed. For example, the shape of the projection portion 68 is not limited to the conical shape, and may be a cylindrical shape, a prismatic shape, or a spherical shape.

As illustrated in FIG. 5, the longitudinal edge member 52 configured in this way pinches the side edge portion of the sheet body 51. In a state where the sheet body 51 is wound, as described above, the longitudinal edge member 52 is fitted into the longitudinal fitting recessed portion 31. Specifically, a portion (hereinafter, referred to as an inner winding portion 69) located inside the longitudinal fitting recessed portion 31 on the inner peripheral side from the side edge portion in the sheet body 51 is folded back at 180° along the inner end portion in the rightward-leftward direction in the second longitudinal member 62. That is, the inner winding portion 69 of the sheet body 51 is folded at 90°, and extends rearward from the side edge portion. Furthermore, the inner winding portion 69 of the sheet body 51 is folded at 90°, and extends outward in the rightward-leftward direction. In the present embodiment, as described above, the guide surface of the longitudinal frame engagement portion 35 has an inclined surface extending forward as it goes inward in the rightward-leftward direction (inclined in the direction opposite to the opening direction of the first longitudinal recessed portion 31a). Therefore, it is possible to avoid interference between a portion located inward in the rightward-leftward direction from the second longitudinal member 62 in the inner winding portion 69 of the sheet body 51 and the longitudinal frame engagement portion 35. In addition, according to the above-described configuration, it is possible to reduce a load applied to the portion located inward in the rightward-leftward direction from the second longitudinal member 62 in the inner winding portion 69 of the sheet body 51.

Furthermore, the sheet body 51 is pulled out from the longitudinal fitting recessed portion 31, and thereafter, is wound around in front of the longitudinal frame portion 21 along the outer peripheral surface of the longitudinal frame portion 21. Specifically, a portion (hereinafter, referred to as an outer winding portion 70) wound around the outer peripheral surface of the longitudinal frame portion 21 in the sheet body 51 is further folded back at 180° with respect to the inner winding portion 69. That is, the outer winding portion 70 of the sheet body 51 is folded at 90°, and extends forward from the inner winding portion 69. Furthermore, the outer winding portion 70 is further folded at 90°, and extends inward in the rightward-leftward direction. A portion extending forward in the outer winding portion 70 is provided from the rear of the second longitudinal member 62 to the outer surface of the longitudinal frame portion 21 across the hinge portion 64.

On the other hand, a portion extending inward in the rightward-leftward direction in the outer winding portion 70 extends along the front surface of the longitudinal frame portion 21, and covers the above-described second longitudinal recessed portion 31b from the front. In the example of FIG. 5, the boundary portion between the outer surface and the front surface of the longitudinal frame portion 21 forms an arc shape protruding outward in the rightward-leftward direction.

As illustrated in FIG. 6, the upper edge member 53 is fitted into the above-described upper fitting recessed portion 32 from the rear. In the following description, in the upper edge member 53, the same reference numerals will be given to configurations corresponding to the above-described longitudinal edge member 52, and description thereof will be omitted.

The upper edge member 53 includes a first upper member 71 disposed on the first surface side of the sheet body 51 (upper edge portion), a second upper member 72 disposed on the second surface side of the sheet body 51, and a hinge portion (connection portion) 74 which connects the respective upper members 71 and 72 to each other.

Figure 10:
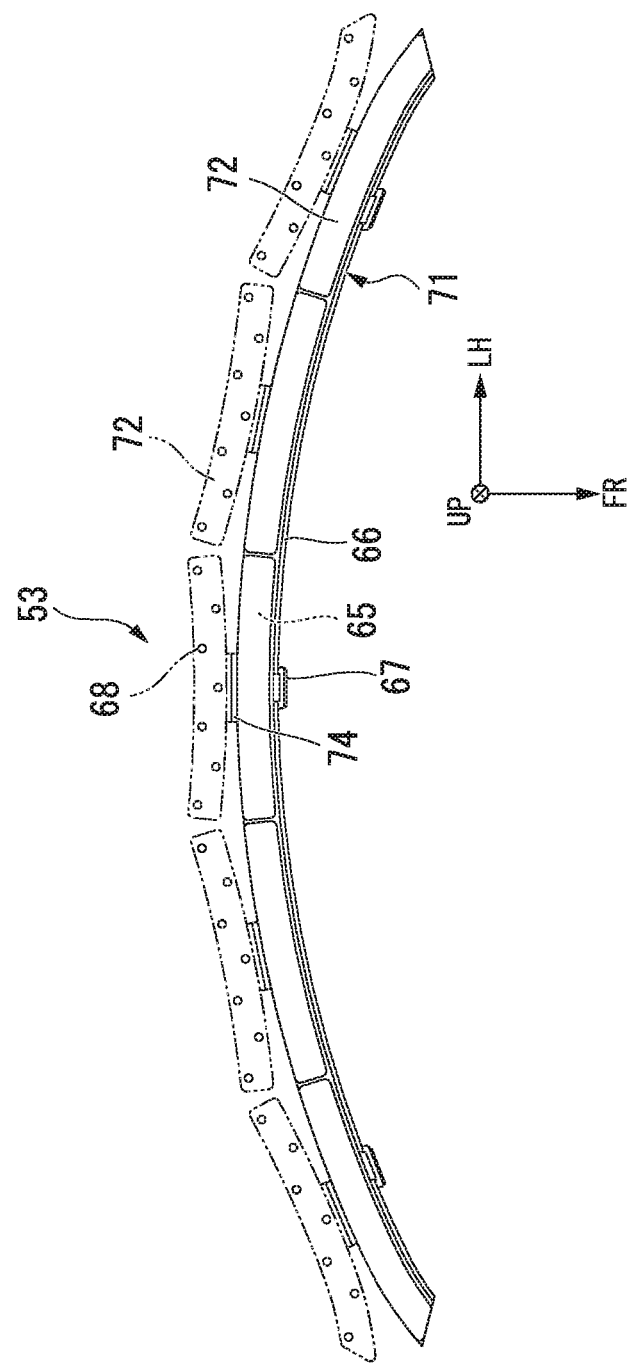
FIG. 10 is a bottom view of an upper edge member according to the embodiment.

FIG. 10 is a bottom view of the upper edge member 53.

As illustrated in FIG. 10, in the base portion 65 of the first upper member 71, an outer shape in plan view when viewed in the upward-downward direction is the same as an outer shape of the upper frame portion 22. As illustrated in FIG. 6, the hook portion 67 of the first upper member 71 engages with the above-described upper frame engagement portion 36 in the forward-rearward direction. The engagement surface of the hook portion 67 moves closer to or comes into contact with the engagement surface of the upper frame engagement portion 36, from the front.

The second upper member 72 is disposed below the first upper member 71 inside the upper fitting recessed portion 32. The second upper member 72 pinches the upper edge portion of the sheet body 51 between the first upper member 71 and the second upper member 72.

The hinge portion 74 connects rear end portions (front side end portions in a direction inserted into the upper fitting recessed portion 32) of the first upper member 71 and the second upper member 72 to each other.

The fixing portion 63 penetrates the upper edge portion of the sheet body 51 in the thickness direction, and fixes the first upper member 71 and the second upper member 72 to each other in the upward-downward direction, by means of welding.

The upper edge member 53 configured in this way pinches the upper edge portion of the sheet body 51. In a state where the sheet body 51 is wound, the upper edge member 53 is fitted into the upper fitting recessed portion 32. Specifically, a portion (hereinafter, referred to as an inner winding portion 76) located inside the upper fitting recessed portion 32 on the inner peripheral side from the upper edge portion in the sheet body 51 is folded back at 180° along the front end portion in the second upper member 72. That is, the inner winding portion 76 of the sheet body 51 is folded at 90°, and extends downward from the upper edge portion. Furthermore, the inner winding portion 76 of the sheet body 51 is folded at 90°, and extends rearward. In the present embodiment, as described above, the guide surface of the upper frame engagement portion 36 has an inclined surface extending upward as it goes forward (inclined in the direction opposite to the opening direction of the first upper recessed portion 32a). Therefore, it is possible to avoid interference between a portion located forward from the second upper member 72 in the inner winding portion 76 of the sheet body 51 and the upper frame engagement portion 36. In addition, according to the above-described configuration, it is possible to reduce a load applied to the portion located forward from the second upper member 72 in the inner winding portion 76 of the sheet body 51.

Furthermore, the sheet body 51 is pulled out from the upper fitting recessed portion 32, and thereafter, is wound around in front of the upper frame portion 22 along the outer peripheral surface of the upper frame portion 22. Specifically, a portion (hereinafter, referred to as an outer winding portion 77) wound around the outer peripheral surface of the upper frame portion 22 in the sheet body 51 is further folded back at 2700 with respect to the inner winding portion 76. That is, the outer winding portion 77 of the sheet body 51 is folded at 90°, extends upward from the inner winding portion 76, is further folded at 90°, and extends forward. Furthermore, the outer winding portion 77 is further folded at 90°, and extends downward. A portion extending upward in the outer winding portion 77 is provided from below the second upper member 72 to the rear surface of the upper frame portion 22 across the hinge portion 74. On the other hand, a portion extending downward in the outer winding portion 77 extends along the front surface of the upper frame portion 22, and covers the above-described second upper recessed portion 32b from the front.

As illustrated in FIG. 7, the lower edge member 54 is fitted into the above-described lower fitting recessed portion 33 from the front. In the following description, in the lower edge member 54, the same reference numerals will be given to configurations corresponding to the above-described longitudinal edge member 52, and description thereof will be omitted.

The lower edge member 54 includes a first lower member 81 disposed on the first surface side of the sheet body 51 (lower edge portion), a second lower member 82 disposed on the second surface side of the sheet body 51, and a hinge portion (connection portion) 84 which connects the respective lower members 81 and 82 to each other.

Figure 11:
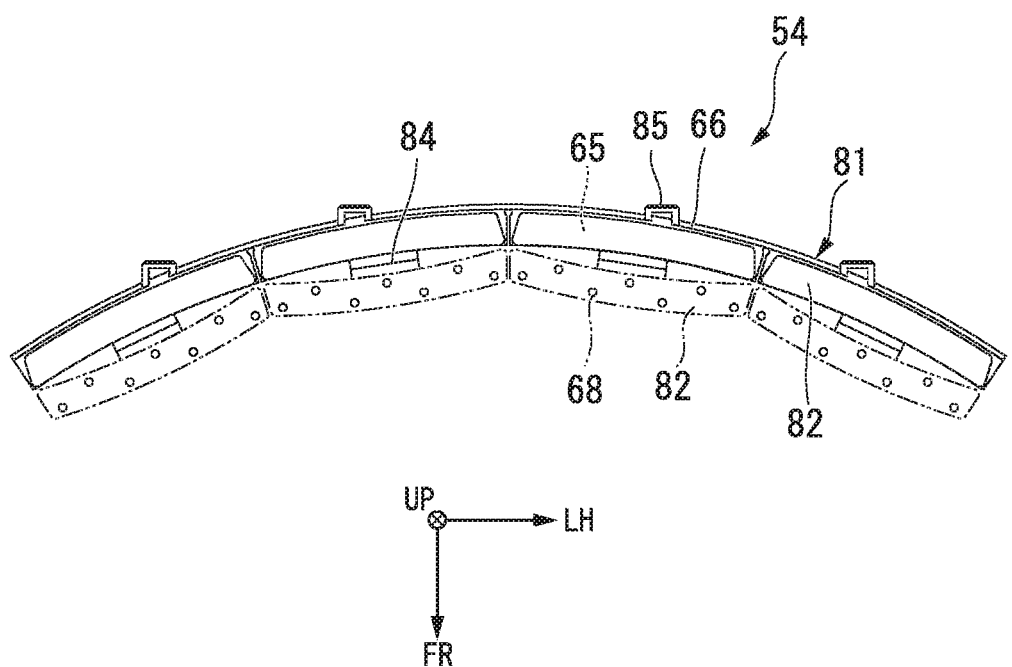
FIG. 11 is a bottom view of a lower edge member according to the embodiment.

FIG. 11 is a bottom view of the lower edge member 54.

As illustrated in FIG. 11, in the base portion 65 of the first lower member 81, an outer shape in plan view when viewed in the upward-downward direction is the same as an outer shape of the lower frame portion 23.

The second lower member 82 is disposed below the first lower member 81 inside the lower fitting recessed portion 33. The second lower member 82 pinches the lower edge portion of the sheet body 51 in the upward-downward direction between the first lower member 81 and the second lower member 82.

The hinge portion 84 connects the front end portions (front side end portions in a direction inserted into the lower fitting recessed portion 33) of the first lower member 81 and the second lower member 82 to each other.

The fixing portion 63 penetrates the lower edge portion of the sheet body 51 in the thickness direction, and fixes the first lower member 81 and the second lower member 82 to each other in the upward-downward direction, by means of welding.

The hook portion 85 of the first lower member 81 is formed in an arch shape protruding rearward in plan view when viewed in the upward-downward direction. The hook portion 85 connects the adjacent step portions 66 to each other in the rightward-leftward direction. As illustrated in FIG. 7, the hook portion 85 engages with the above-described lower frame engagement portion 37 in the forward-rearward direction. The lower end portion of the hook portion 85 protrudes downward from the second lower member 82. In this case, the lower end portion of the hook portion 85 is accommodated in a portion located below the narrow portion 34b in the above-described wide portion 34a. In addition, the rear surface of the hook portion 85 has a guide surface inclined upward as it goes rearward. On the other hand, the front surface of the hook portion 67 has an engagement surface extending in a direction orthogonal to the forward-rearward direction. The engagement surface of the hook portion 85 moves closer to or comes into contact with the engagement surface of the lower frame engagement portion 37, from the inside in the rightward-leftward direction.

Figure 12:
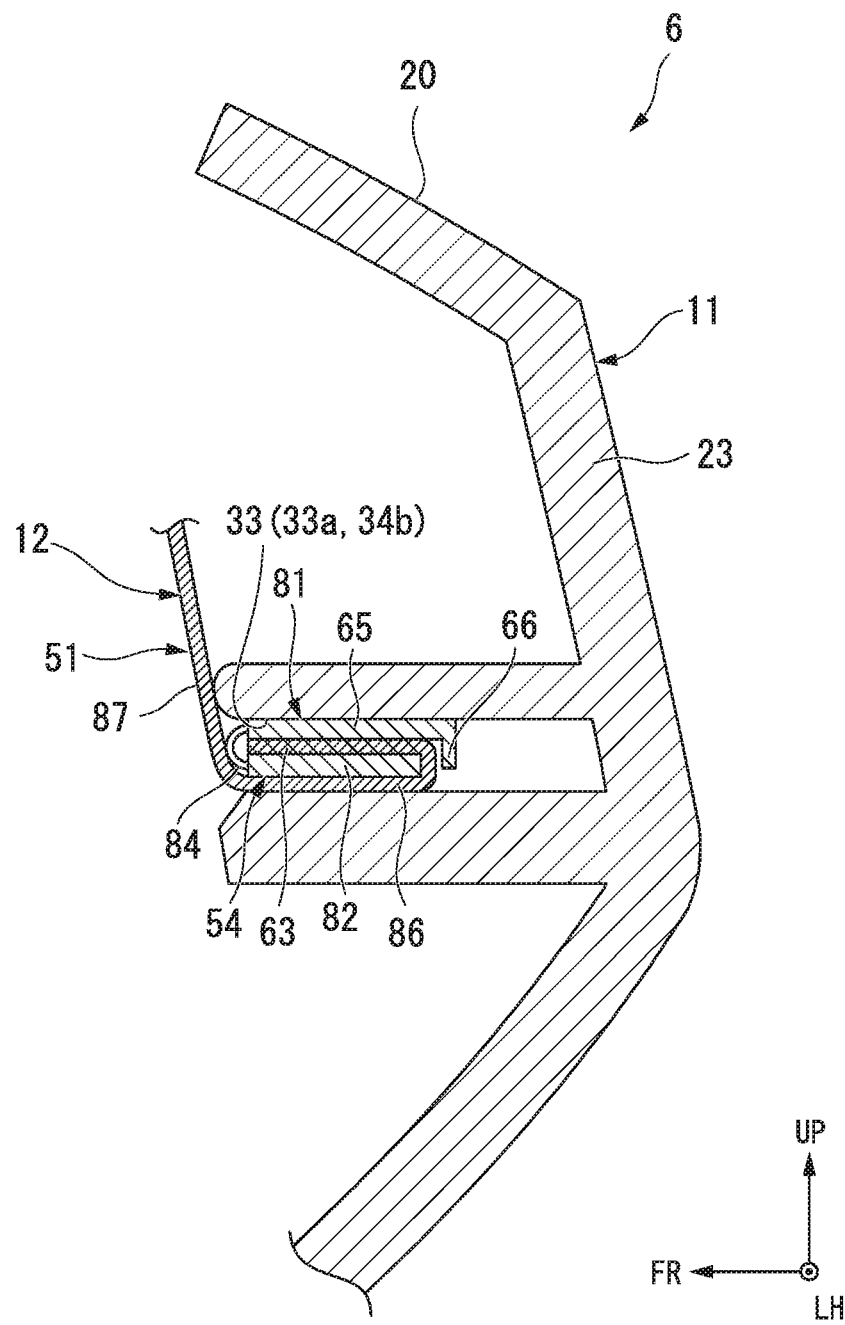
FIG. 12 is a sectional view taken along line XII-XII in FIG. 4.

FIG. 12 is a sectional view taken along line XII-XII in FIG. 4.

As illustrated in FIG. 12, the lower edge member 54 configured in this way pinches the lower edge portion of the sheet body 51. In a state where the sheet body 51 is wound, the lower edge member 54 is fitted into the lower fitting recessed portion 33.

Specifically, a portion located inside the narrow portion 34b of the first lower recessed portion 33a in the lower edge member 54 is pinched in the upward-downward direction by the top surface and the bottom surface of the narrow portion 34b. On the other hand, as illustrated in FIG. 7, a portion located inside the wide portion 34a of the first lower recessed portion 33a in the lower edge member 54 has a gap between the second lower member 82 and the bottom surface of the wide portion 34a in the upward-downward direction.

As illustrated in FIGS. 7 and 12, a portion (hereinafter, referred to as an inner winding portion 86) located inside the lower fitting recessed portion 33, which is a portion on the inner peripheral side from the lower edge portion in the sheet body 51, is folded back at 180° along the rear end portion of the second lower member 82. That is, the inner winding portion 86 of the sheet body 51 is folded at 90°, and extends downward from the lower edge portion. Furthermore, the inner winding portion 86 is folded at 90°, and extends forward.

Furthermore, the sheet body 51 is pulled out from the lower fitting recessed portion 33, and thereafter, is wound around in front of the lower frame portion 23 along the outer peripheral surface of the lower frame portion 23. Specifically, a portion (hereinafter, referred to as an outer winding portion 87) wound around the outer peripheral surface of the lower frame portion 23 in the sheet body 51 is further folded back at 90° with respect to the inner winding portion 86. That is, the outer winding portion 87 of the sheet body 51 is folded at 90°, and extends upward from the inner winding portion 86. In this case, the outer winding portion 87 is provided from below the second lower member 82 to the front surface of the lower frame portion 23 across the hinge portion 84.

In this manner, the extension material 12 is stretched across the backrest frame 11 (respective frame portions 21 to 23) in a state where the sheet body 51 closes the opening portion 20 of the backrest frame 11 from the front and desired tension is applied to the sheet body 51.

Next, a method of manufacturing the extension material 12 will be described. Specifically, a method of fixing the sheet body 51 and the edge members 52 to 54 will be described. The methods of fixing the respective edge members 52 to 54 are the same as each other. Therefore, in the following description, a method of fixing the longitudinal edge member 52 and the side edge portion of the sheet body 51 will be described, and description of the method of fixing the other edge members 53 and 54 and the edge portion of the sheet body 51 will be omitted.

Figure 13:
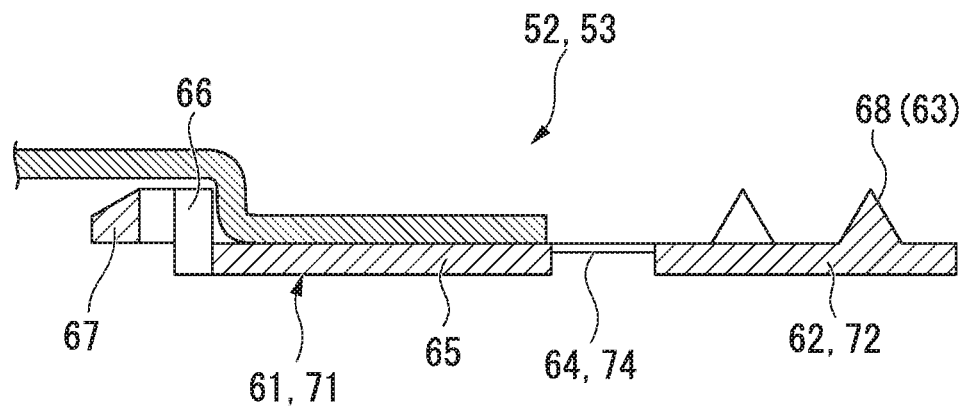
FIG. 13 is a process drawing describing a method of manufacturing an extension material, and is a sectional view corresponding to FIG. 9.
Figure 14:
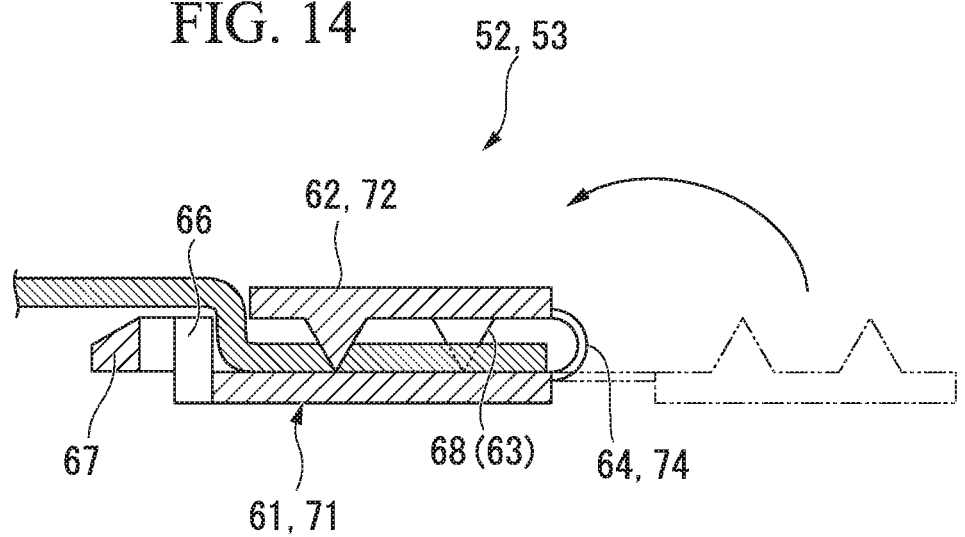
FIG. 14 is a process drawing describing the method of manufacturing the extension material, and is a sectional view corresponding to FIG. 9.
Figure 15:
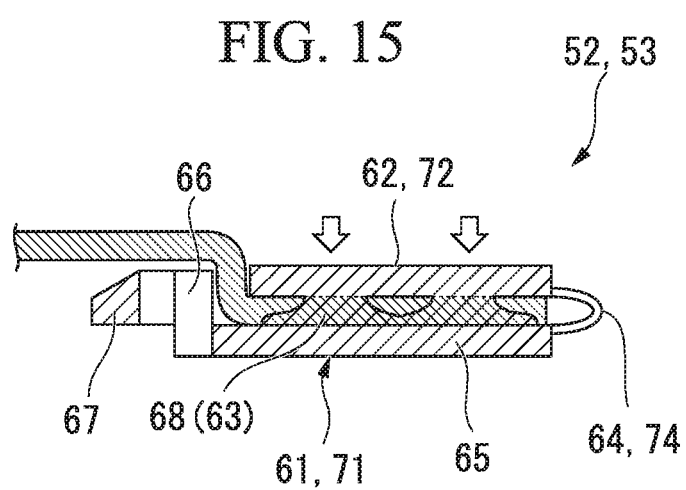
FIG. 15 is a process drawing describing the method of manufacturing the extension material, and is a sectional view corresponding to FIG. 9.

FIGS. 13 to 15 are process drawings describing a method of manufacturing the extension material 12, and are sectional views corresponding to FIG. 9.

First, as illustrated in FIG. 13, in a state where the first longitudinal member 61 and the second longitudinal member 62 are deployed, the longitudinal edge member 52 is set on a welding machine (edge member setting step). The first longitudinal member 61 and the second longitudinal member 62 of the longitudinal edge member 52 are configured to be pivotable via the hinge portion 64 in a direction closer to or apart from the sheet body 51 in the mutual thickness direction, in a state before being fixed to the sheet body 51.

Next, the side edge portion of the sheet body 51 is set on the first longitudinal member 61 (sheet setting step). In this case, the side edge portion of the sheet body 51 is set so that the sheet body 51 is pulled out from the step portion 66 side of the first longitudinal member 61.

Subsequently, as illustrated in FIG. 14, the side edge portion of the sheet body 51 is pinched between the first longitudinal member 61 and the second longitudinal member 62 (pinching step). Specifically, the second longitudinal member 62 is caused to pivot around the hinge portion 64 with respect to the first longitudinal member 61. In this manner, the first longitudinal member 61 and the second longitudinal member 62 are arranged facing each other by pinching the side edge portion of the sheet body 51 therebetween. In this case, as the second longitudinal member 62 pivots, the projection portion 68 formed in the second longitudinal member 62 penetrates the mesh portion of the sheet body 51, and abuts against the first longitudinal member 61. Thereafter, the sheet body 51 and the longitudinal edge member 52 (the first longitudinal member 61 and the second longitudinal member 62) are pinched in the thickness direction by using a clamp (not illustrated). An accommodation recessed portion for accommodating the distal end portion of the projection portion 68 may be formed in a portion against which the projection portion 68 abuts in the first longitudinal member 61.

Subsequently, as illustrated in FIG. 15, the projection portion 68 is used so as to weld the first longitudinal member 61 and the second longitudinal member 62 to each other together with the sheet body 51 (fixing step). The fixing step according to the present embodiment is performed by ultrasonic welding, for example. Specifically, while the longitudinal edge member 52 and the sheet body 51 are pressurized in the thickness direction, ultrasonic waves are applied to the projection portion 68 from the second longitudinal member 62 side. Then, only the projection portion 68 interposed between the first longitudinal member 61 and the second longitudinal member 62 in the longitudinal edge member 52 is melted. A resin material melted into a liquid phase is wet and spreads in the plane direction of the sheet body 51 between the first longitudinal member 61 and the second longitudinal member 62 while passing through the mesh portion of the sheet body 51. Thereafter, the longitudinal edge member 52 is cooled so as to solidify the melted resin material. In this manner, the first longitudinal member 61 and the second longitudinal member 62 are fixed to each other together with the sheet body 51 by the solidified resin material. That is, according to the present embodiment, the projection portion 68 is melted and solidified, thereby causing the projection portion 68 to function as the fixing portion 63 for fixing the first longitudinal member 61 and the second longitudinal member 62 to each other. In this manner, the sheet body 51 is fixed to the longitudinal edge member 52.

Thereafter, the upper edge member 53 and the lower edge member 54 are respectively fixed to the upper edge portion and the lower edge portion of the sheet body 51 by using the same method as that described above.

In this manner, the above-described extension material 12 is completely manufactured.

Next, an assembling method for assembling the above-described extension material 12 to the backrest frame 11 will be described. Specifically, an operation performed when each of the edge members 52 to 54 is assembled into the fitting recessed portions 31 to 33 will be described. The methods of assembling of the respective edge members 52 to 54 are all the same method. Therefore, in the following description, a case will be described where the longitudinal edge member 52 is assembled into the longitudinal fitting recessed portion 31. Description of the method of assembling the other edge members 53 and 54 into the fitting recessed portions 32 and 33 will be omitted.

First, the inner winding portion 69 of the sheet body 51 is wound around the longitudinal edge member 52.

Thereafter, the longitudinal edge member 52 together with the inner winding portion 69 is pushed into the first longitudinal recessed portion 31a of the longitudinal fitting recessed portion 31. In this case, the longitudinal edge member 52 is pushed into the first longitudinal recessed portion 31a in a state where the hook portion 67 side of the longitudinal edge member 52 faces the first longitudinal recessed portion 31a. Then, the longitudinal edge member 52 enters inward in the rightward-leftward direction inside the first longitudinal recessed portion 31a.

If the longitudinal edge member 52 enters inside the first longitudinal recessed portion 31a, the guide surface of the hook portion 67 in the longitudinal edge member 52 abuts against the guide surface of the longitudinal frame engagement portion 35 in the longitudinal fitting recessed portion 31. In this state, if the longitudinal edge member 52 is further pushed inward in the rightward-leftward direction, the hook portion 67 is elastically deformed forward. In this manner, while the guide surface of the hook portion 67 comes into sliding contact with the guide surface of the longitudinal frame engagement portion 35, the longitudinal edge member 52 enters inward in the rightward-leftward direction.

Then, when the guide surface of the hook portion 67 rides over the guide surface of the longitudinal frame engagement portion 35, the hook portion 67 is deformed to restore the original state. In this manner, the engagement surface of the hook portion 67 moves closer to or comes into contact with the engagement surface of the longitudinal frame engagement portion 35, from the inside in the rightward-leftward direction, and the hook portion 67 engages with the longitudinal frame engagement portion 35.

In a case where the upper edge member 53 is assembled to the upper fitting recessed portion 32, and in a case where the lower edge member 54 is assembled to the lower fitting recessed portion 33, all of these can also be assembled by using the same method as that described above.

In this way, the present embodiment adopts a configuration including the fixing portion 63 as follows. In a state where the fixing portion 63 penetrates the sheet body 51 in the thickness direction, the fixing portion 63 fixes the first member (the first longitudinal member 61, the first upper member 71, and the first lower member 81) and the second member (the second longitudinal member 62, the second upper member 72, and the second lower member 82), together with the sheet body 51.

According to this configuration, in the above-described fixing step, when the fixing portion 63 melted into a liquid phase is wet and spreads between the first member and the second member in the plane direction of the sheet body 51, the fixing portion 63 penetrates the mesh portion of the sheet body 51, thereby interlocking the fixing portion 63 with the mesh portion (so-called anchor effect). In this state, the fixing portion 63 is solidified, thereby enabling the sheet body 51 to be firmly fixed between the first member and the second member. In this manner, it is possible to ensure fixing strength between the sheet body 51 and the respective edge members 52 to 54. Accordingly, regardless of a direction or a magnitude of a load (acting in the plane direction and the planarly perpendicular direction) applied to the sheet body 51, it is possible to prevent the sheet body 51 and the edge members 52 to 54 from being stripped away from each other.

In addition, the sheet body 51 is pinched in the thickness direction with the first member and the second member. In this manner, it is possible to ensure the fixing strength acting on the sheet body 51 on both sides in the planarly perpendicular direction.

In particular, according to the present embodiment, the first member and the second member are fixed to each other by the fixing portion 63. In this manner, for example, compared to a case where the edge member is molded in the sheet body as in the related art, it is possible to simplify a molding die for molding the edge member. Therefore, it is possible to achieve cost reduction and improved manufacturing efficiency. Furthermore, the edge members 52 to 54 are manufactured as a single body. Accordingly, compared to the above-described molding, the edge members 52 to 54 can be more freely designed.

According to the present embodiment, the projection portion 68 of the second member is caused to function as the fixing portion 63. Accordingly, compared to a case of using the fixing portion, which is a separate body from the first member and the second member, it is possible to achieve improved manufacturing efficiency. In addition, in the above-described pinching step, the projection portion 68 of the second member penetrates the sheet body 51 in the thickness direction. Accordingly, the movement of the sheet body 51 in the plane direction with respect to the edge members 52 to 54 until the fixing step can be regulated by the projection portion 68. In this manner, the edge portion of the sheet body 51 can be fixed to the edge members 52 to 54 at a desired position.

According to the present embodiment, the projection portion 68 decreases in diameter from the proximal end portion to the distal end portion. Accordingly, the projection portion can easily penetrate the sheet body 51 (mesh portion) in the pinching step. In addition, in the above-described pinching step, surface pressure acting between the first member and the projection portion 68 can be increased. Therefore, it is possible to prevent misalignment between the first member and the second member in the plane direction.

Furthermore, when the projection portion 68 is fixed by means of ultrasonic welding, it is possible to prevent ultrasonic waves applied to the projection portion 68 from being diffused as the ultrasonic waves propagate to the distal end portion. That is, it is possible to effectively apply the ultrasonic waves to the whole projection portion 68.

Therefore, it is possible to achieve further improved manufacturing efficiency.

The present embodiment adopts a configuration in which the first member and the second member are connected to each other so as to be pivotable in the direction closer to or apart from the sheet body 51.

According to this configuration, in a state before the projection portion 68 is fixed to the sheet body 51, the edge members 52 to 54 are easily handled. In addition, the first member and the second member are caused to pivot in the direction closer to the sheet body 51 when work for fixing the projection portion 68 to the sheet body 51 is carried out. Accordingly, the sheet body 51 can be pinched between the first member and the second member. In this manner, compared to a case where the sheet body is pinched with the first member and the second member, which are separate bodies, it is possible to easily and very accurately align the first member and the second member with each other. As a result, it is possible to achieve further improved manufacturing efficiency.

Then, the backrest 6 and the chair 1 according to the present embodiment include the extension material 12. Therefore, it is possible to provide the backrest 6 and the chair 1 which prevent time-dependent degradation and which are excellent in reliability and durability.

In the above-described embodiment, a configuration has been described in which the projection portion 68 penetrates the thickness direction of the sheet body 51 in the pinching step. However, the configuration is not limited thereto. At least when the fixing portion is melted and solidified, the fixing portion may penetrate the sheet body 51 in the thickness direction.

In the above-described embodiment, a configuration has been described in which the first member and the second member are connected to each other so as to be pivotable via the hinge portion. However, as long as the first member and the second member are movable in the direction closer to or apart from the sheet body 51, the method of connecting the first member and the second member to each other can be appropriately changed in design.

Next, a modification example according to the present embodiment will be described. This modification example is different from the above-described embodiment in that a first member 101, a second member 102, and a projection portion 103 are formed as separate bodies.

In the following description, the same reference numerals will be given to configurations the same as those according to the above-described embodiment, and description thereof will be omitted.

Figure 16:
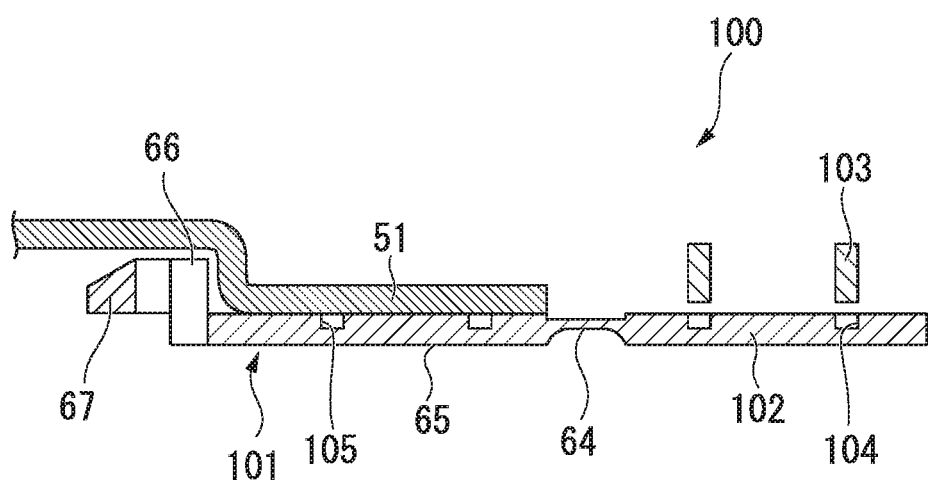
FIG. 16 is a sectional view of an edge member according to a modification example of the embodiment.

FIG. 16 is a sectional view of an edge member 100 according to the modification example.

In the edge member 100 illustrated in FIG. 16, the projection portion 103 is formed in a cylindrical shape, for example. The first member 101 and the second member 102 have accommodation recessed portions 104 and 105 which accommodate the projection portion 103.

In this case, the above-described pinching step is performed in a state where one end portion of the projection portion 103 is accommodated inside one of the accommodation recessed portions 104 and 105 in the first member 101 and the second member 102. In this manner, the other end portion of the projection portion 103 is accommodated inside the other one of the accommodation recessed portions 104 and 105 in the first member 101 and the second member 102. Thereafter, the first member 101 and the second member 102 are welded to each other by the projection portion 103 by using the same method as that in the above-described fixing step.

According to this configuration, it is possible to more freely select a material for the first member 101, the second member 102, and the projection portion 103. For example, the projection portion 103 is configured to include a material having a lower melting point (softening point) than a material of the first member 101 and the second member 102. In this manner, thermal welding also enables the first member 101 and the second member 102 to be welded to each other by the projection portion 103.

The technical scope of the present disclosure is not limited to each of the above-described embodiments, and various modifications may be added to the above-described embodiments within the scope not departing from the gist of the present disclosure. That is, the configurations described above in the embodiments are merely examples, and can be appropriately modified.

For example, in the above-described embodiment, a case has been described where the present disclosure is applied to the extension material 12 used for the backrest 6 of the chair 1. However, the present disclosure is not limited thereto. For example, the present disclosure may be applied to the seat body 4. In addition, the furniture surface component member or the furniture sheet according to the present disclosure can be applied to various items of furniture such as a panel for partitioning an office space.

In the above-described embodiment, a configuration has been described in which the extension material 12 is stretched between the respective frame portions 21 to 23 of the backrest frame 11. However, without being limited thereto, a configuration may be adopted in which the extension material 12 is provided between at least two support portions. In a case the extension material 12 is provided, tension may not be applied to the extension material 12.

In the above-described embodiment, a configuration has been described in which the first member and the second member are welded to each other by means of ultrasonic welding or thermal welding. However, without being limited thereto, various welding methods may be adopted.

In addition, without being limited to welding, the first member and the second member may be fixed to each other by means of adhesion.

Even in this case, the first member and the second member can be fixed to each other together with the sheet body 51 by performing the fixing step in a state where the fixing portion is interposed between the first member and the second member.

In the above-described embodiment, a configuration has been described in which the respective edge members 52 to 54 are fitted into the fitting recessed portions 31 to 33 in a state in which the sheet body 51 is wound around the respective edge members 52 to 54. However, the present disclosure is not limited thereto.

Alternatively, within the scope not departing from the gist of the present disclosure, the configuration elements in the above-described embodiment can be replaced with well-known configuration elements. In addition, the above-described respective modification examples may be appropriately combined with each other.

INDUSTRIAL APPLICABILITY

According to the furniture sheet, the method of manufacturing the furniture sheet, the furniture surface component member, and the item of furniture in the present disclosure, it is possible to ensure the fixing strength between the sheet body and the edge member, while achieving cost reduction, improved manufacturing efficiency, and much freer design.

The invention claimed is:

1. An item of furniture, comprising:
a furniture surface component member,
wherein the furniture surface component member includes
at least two support portions arranged apart from each other, and
a furniture sheet provided between the support portions,
wherein the furniture sheet includes
a sheet body that has through-holes in at least edge portions, and
edge members that are disposed on the edge portions of the sheet body and are respectively attached to the support portions corresponding thereto,
wherein each of the edge members includes
a first member that is disposed on a first surface side of the sheet body,
a second member that is disposed on a second surface side of the sheet body, the sheet body being pinched between the first member and the second member,
a fixing portion that fixes the first member and the second member to each other together with the sheet body through a through-hole of the through-holes of the sheet body, and
a connection portion that connects the first member and the second member to each other such that the first member and the second member are movable in a direction closer to or apart from the sheet body, and
wherein the support portions have fitting recessed portions which are open on outer peripheral surfaces of the support portions and into which the edge members of the furniture sheet are fitted.

* * * * *